Nov. 22, 1938.   H. R. CRAGO   2,137,833
SELECTIVE CONTROL FOR AIR CONDITIONING APPARATUS
Filed June 6, 1936
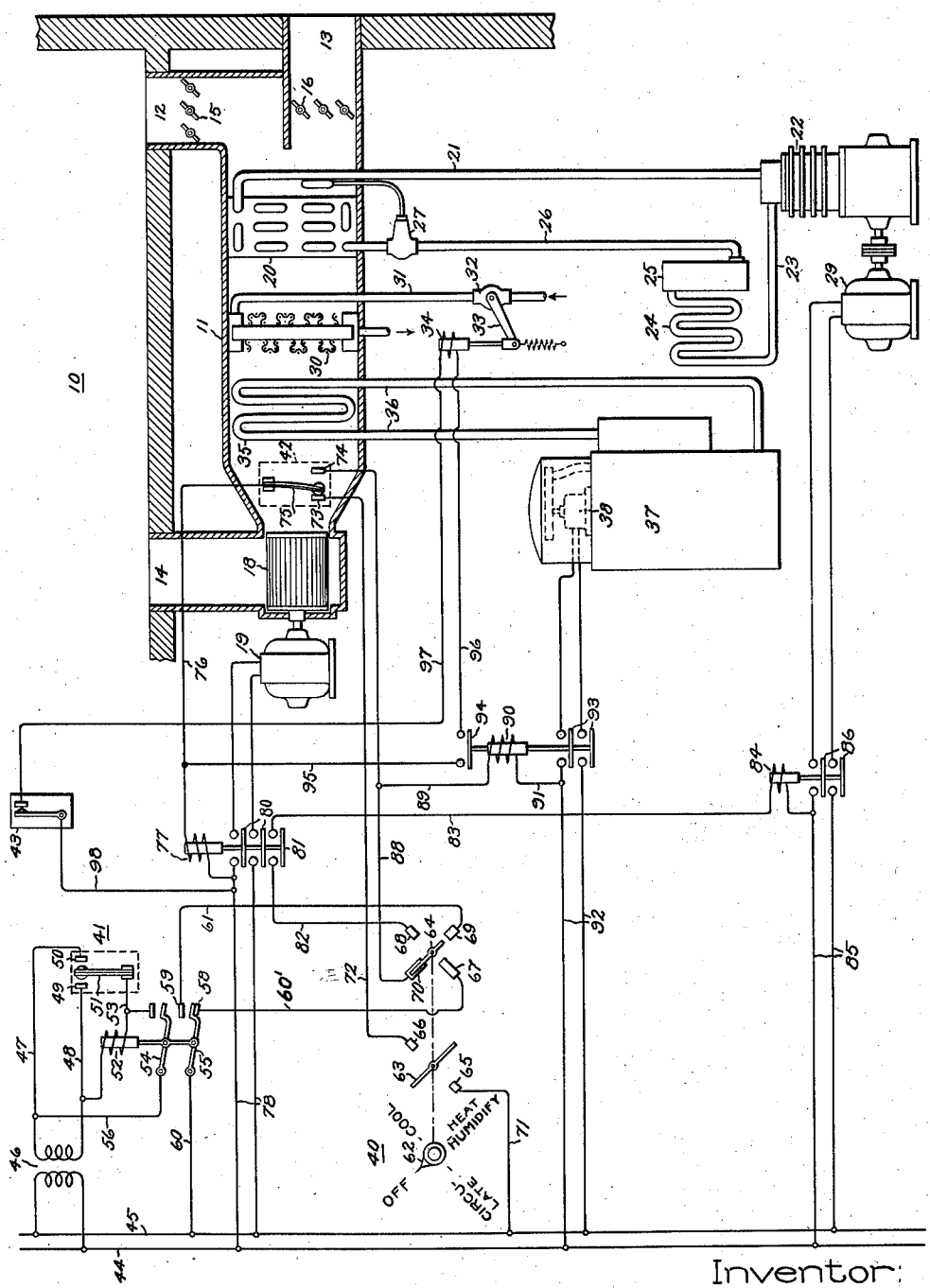
Inventor:
Harry R. Crago,
by Harry E. Dunham
His Attorney.

Patented Nov. 22, 1938

2,137,833

UNITED STATES PATENT OFFICE 2,137,833

SELECTIVE CONTROL FOR AIR CONDITIONING APPARATUS

Harry R. Crago, Caldwell, N. J., assignor to General Electric Company, a corporation of New York Application June 6, 1936, Serial No. 83,921

9 Claims. (Cl. 236—44)

My invention relates to a control for air conditioning apparatus and more particularly to improvements in control of the type in which the function to be performed by the apparatus is under a selective control.

In controls of the type wherein the function to be performed by the apparatus may be selected manually, or automatically, if desired, it is not enough that the control be made as simple as possible to obtain manufacturing economies and certainty of operation after installation. A primary consideration is the comfort and well-being of persons who must enter the conditioned space or zone. Thus, in addition to providing control with a thermal responsive means whereby the various conditioning means selected are operated in response to temperature conditions obtaining in the space being conditioned, it has been found desirable to operate the air circulating means of the conditioner, such as an electrically driven fan, intermittently during heating and continuously during cooling. The intermittent operation during heating is resorted to in numerous installations to avoid the alternate blowing of hot and cold air resulting when the supply of the heating medium has been terminated and the cold ventilating air is discharged unheated into the space. The continuous operation of the air circulating means while the cooling means is in operation, on the other hand, is desirable in order to prevent frosting of the cooling coils, useless operation of the cooling equipment and to obtain through constant circulation of the air the cooling effect resulting from circulation alone and continuous filtration of the air.

The intermittent operation of the fan during heating may be obtained by placing the fan under the control of the thermal responsive means located within the space being conditioned so that the fan is operated only when the heating apparatus is in operation. Such an arrangement is disclosed in the copending application of Edward W. Roessler, Serial No. 32,758, filed July 23, 1935, assigned to the assignee of the present application. However, it has been found desirable to prevent the blowing of air into the space immediately upon initiation of the heating means under the control of the space thermal responsive means because of the fact that the temperature of the air discharged in the space being conditioned does not rise immediately to a suitable temperature. To prevent the circulation of the air until the temperature thereof rises to a predetermined high value a second thermal responsive means positioned adjacent to or in the near vicinity of the heating means may be provided. This thermal responsive means is so constructed and correlated with the other control that the fan is energized only after the air is heated to a desired value.

It is, therefore, a primary object of my invention to provide an improved and simplified control arrangement for obtaining the desirable results outlined above.

More specifically, it is an object of my invention to provide a control arrangement in which the thermal responsive means located adjacent the heating means forms part of both the heating and cooling control circuits.

A further object of my invention is to provide an improved control in which the air circulating means cannot operate unless the thermal responsive means is actuated to a "hot" position as a result of proper functioning of the heating means when the latter is selected for operation and in which the aforementioned thermal responsive means, when in its "cold" position, also forms part of a permanent energizing circuit for the fan when the cooling means is selected for operation.

It is another object of my invention to provide the conditioning apparatus with humidifying means that is placed under the control of a humidostat positioned within the space being conditioned only when heating is selected and when heat is called for by the space thermal responsive means and the air circulating means is in operation. The purpose of this control arrangement is to prevent the wastage of water that would result from supplying water to the humidifier prior to the time the air circulating means is effective to circulate the humidified air to the space being conditioned. In this respect, the present application is a continuation in part of my copending application, Serial No. 41,577, filed September 21, 1935.

Other objects of my invention will become apparent from the ensuing description taken in conjunction with the accompanying drawing in which is set forth for the purpose of illustration the details of arrangement.

The single figure of the drawing shows diagrammatically air conditioning apparatus designed for year around operation and illustrates schematically a control system therefor embodying the feature of the present invention.

Referring to the figure, reference numeral 10 designates a space such as a room, building or the like to which the conditioned medium such as air is to be supplied. The conditioned air is supplied to the space by an air conditioner 11 preferably located without said space and provided with the usual recirculated air duct 12, a fresh air duct 13 and a discharge duct 14. The proportions of recirculated and fresh air may be controlled by dampers 15 and 16 in the recirculated and fresh air ducts, respectively. These may be controlled either manually or automatically in response to indoor or outdoor temperature conditions. The conditioner is also provided with a fan 18 positioned in the discharge duct and driven by an electric motor 19 that is controlled in a manner hereinafter to be described. The air drawn through the conditioner may be conditioned by suitable heating, cooling and humidifying means forming part of the conditioner and while I have shown a manually operable selector switch for selecting the apparatus desired for operation, my invention is not necessarily limited to such an arrangement, as will appear from the ensuing description.

The cooling means consists of the usual mechanical refrigerating apparatus comprising an evaporator, compressor, condenser, liquid receiver and expansion valve. The evaporator 20 is connected by a refrigerant line 21 to the suction side of a compressor 22. The high pressure side of the compressor is connected by conduit 23 to a condenser 24 which may be cooled in any suitable manner. The condenser in turn is connected to a liquid receiver 25 and the latter is connected through conduit 26 to an expansion valve 27 controlling the refrigerant to the evaporator. The compressor itself is driven by a suitable prime mover such as an electric motor 29 controlled in the manner hereinafter to be described.

To properly humidify the air supply to the space 10 during seasons when heating is required, I have provided a humidifying apparatus 30. This is illustrated as being of the wire screen type but may be of any other desirable construction. Water is supplied to the humidifier through a conduit 31 under the control of a valve 32 having spring biased operating arm 33 and adapted to be moved from closed to open position, and vice versa, by any suitable operating means such as the electrical solenoid 34 illustrated in the drawing.

The heating means of the conditioner is diagrammatically illustrated as a coil 35 adapted to be supplied with a suitable heating medium such as steam or hot water through conduits 36 leading to a furnace 37 of any well known type. The latter is adapted to increase the supply of heat available to the heating coil 35 upon the energization of an electrically operated motor 38 and likewise to decrease the supply of heat upon the de-energization of this motor. The energization of the motor itself is under the control of thermal responsive means located within the space being conditioned and the control therefore will be described more in detail later. It is obvious to those skilled in the art that instead of energizing the furnace motor 38, I may equally well control the position of a valve in one of the conduits 36 and thus control the supply of steam or hot water to the heating coil from a suitable central source.

The selection of the function to be performed by the conditioning apparatus may be made by a manually rotatable selector switch 40 having four positions to which it may be moved, as indicated in the figure, whereby the conditioner may be made to circulate, cool, or heat and humidify the air. The control arrangement, which will be described in greater detail later, is such that when either heating or cooling is selected the respective apparatus will be placed under the control of thermal responsive means 41 positioned in the space 10 being conditioned. As brought out generally heretofore, the air circulating means is under the joint control of the space thermal responsive means and a second thermal responsive means 42, usually called a heat exchanger thermostat, positioned adjacent to or in the near vicinity of the heating means 35 so as to be operated intermittently under the control of the space thermal responsive means when heating is selected and to be operated continuously whenever cooling is selected. The control of the humidifying means of the conditioner is so arranged that the latter is in condition to be operated only during that period when heating is selected and the fan has been placed in operation. When these conditions obtain, it will be placed under the control of a humidostat 43 positioned within the space being conditioned and responsive to humidity variations therein.

The various electrical circuits whereby the control outlined above may be obtained will be now described in detail. The control circuits and the electrical apparatus of the system are provided with electrical energy from a suitable source 44—45. The space thermal responsive means 41, or room thermostat as it will be referred to hereinafter, is provided with low voltage energy through a transformer 46. The secondary winding of the transformer is connected by conductors 47 and 48 to a pair of stationary contacts 49 and 50 associated with the thermal responsive element 51 of room thermostat. Associated with the thermostat is a relay 52 connected to conductor 48 and to the element 51 through a conductor 53. The thermal responsive element 51 may be of any well known construction, and it is illustrated as a bimetallic member arranged to move to the right into engagement with contact 50 whenever the temperature within the zone decreases below a predetermined minimum value and into engagement with contact 49 when the temperature rises above the predetermined maximum value.

Associated with the relay is a pair of switches 54 and 55, the former adapted when moved upwardly to close a holding circuit for the relay 52 through the conductor 56 and the second to control the energization of relays controlling the operation of the apparatus selected for operation by the manually operable selector switch 40. The relay controlling the cooling apparatus is adapted to be energized when switch 55 is in engagement with its associated contact 58, when the cooling apparatus is selected for operation and the relay controlling the heating apparatus is adapted to be energized when the switch is in engagement with contact 59 when the heating apparatus is selected. One terminal of the switch member 55 is connected to supply conductor 45 through an electrical conductor 60. The stationary contacts 58 and 59 are connected by means of conductors 60' and 61, respectively, hereinafter to be described, to portions of the manually operable selector switch 40.

The selector switch consists of a manually operable knob and indicating member 62 and a pair of rotatable switches 63 and 64 adapted to be rotated thereby. Switch 63 is adapted to close a circuit across stationary contacts 65 and 66 when the cooling apparatus is selected and when it is desired to circulate the air. Switch 64 has associated therewith four contacts 67, 68, 69, and 70 and it is adapted to engage contacts 67 and 68 when cooling is selected and contacts 69 and 70 when heating is selected. It may be noted from the diagram that the aforementioned conductors 60' and 61 connecting the room thermal control to the apparatus are connected to contacts 67 and 69, respectively. It is also obvious from the drawing that when the selector switch is in its off position, all of the control circuits are de-energized.

When circulation of the air alone is desired, selector switch 40 is placed into its circulate position to close a circuit across contacts 65 and 66 and through the heat exchanger thermostat 42 located adjacent the heating means to energize fan motor 19. The fan motor control relay circuit is connected across supply conductors 44 and 45 as follows: from conductor 45 through conductor 71 to the contact 65, switch 63, contact 66, conductor 72 leading to one of a pair of contacts 73 and 74 with which the bimetallic element 75 of the thermal responsive means 42 is in engagement at all temperatures below a certain predetermined value, conductor 76 and the fan control relay 77 connected through one of a pair of conductors 78 to the other supply conductor 44. Fan motor 19 is supplied with electrical energy through the last mentioned pair of electrical conductors upon the closure of a pair of switches 80 moved upwardly upon energization of the fan control relay. The fan control relay also controls a switch member 81 having associated therewith a pair of contacts, one connected to contact 68 by a conductor 82 and the other through the conductor 83 to a relay 84 controlling the operation of the compressor motor 29. The other side of the last mentioned relay is connected to one of a pair of conductors 85 through which electrical energy is supplied to the compressor motor from the supply conductors through a pair of switch members 86 operated by the relay 84.

The arrangement just described is the cooling control circuit and it will be obvious to those skilled in the art that when the selector switch is turned to its cool position, the energization of the relay 84 is under the control of the thermostatically controlled switch 55 operated in response to variations in room temperature.

When heating is selected, the switch member 64 closes a circuit across contacts 69 and 70 of the selector switch. Contact 70 is connected by a conductor 88 to the second terminal 74 of the heat exchanger thermostat 42 and a branch conductor 89 leads from conductor 88 to a relay 90. The other terminal of the relay just mentioned is connected by a conductor 91 to one of a pair of conductors 92 through which the furnace control is energized upon closure of a pair of switches 93 upon energization of relay 90. Relay 90 has associated therewith a third switch 94 that is moved upwardly upon energization of the relay to close a circuit conditioning the humidity control circuit. One of the contacts associated with switch 94 is connected by conductor 95 to conductor 76 and the other to a conductor 96 leading to the valve operating solenoid 34 in turn connected by a conductor 97 to the humidostat 43 positioned in space 10. The other terminal of the humidostat 43 is connected by a conductor 98 to supply conductor 45 through one of a pair of conductors 78 leading to the fan motor.

The description of the operation of the system as a whole will now be given. When the selector switch 40 is in its off position, as indicated in the drawing, it is obvious that the apparatus will remain de-energized because all the conductors leading from the main supply conductors 44 and 45 remain disconnected from the apparatus of the conditioner.

When it is desired to circulate the air through the zone, the selector switch 40 is turned to the circulate position. The fan control relay 77 is thereby connected across the supply conductors 44 and 45 through the following circuit: From supply conductor 45, conductor 71, contact 65, switch 63, contact 66, conductor 72, contact 73, bimetallic element 75 in engagement with contact 73, conductor 76, relay 77 and through one of a pair of conductors 78 to the other supply conductor 44. The resulting energization of the relay 77 effects upward movement of its associated switches 80 and 81. The former effects connection of the fan motor 19 across the supply conductors and the result is a continuous circulation of air through the zone. It may be briefly noted that in the circulate position the closure of switch 81 has no operative effect, but merely conditions a circuit for the compressor control relay 84.

When it is desired to cool the air, the manually operated selector switch 40 is turned to the cool position. At this time, switch 63 is again moved to the position in which the circuit is closed across contacts 65 and 66 to effect closure of the above described circuit and energization of relay 77. Circulation of air through the conditioner and into the space is thus effected. Switch 64 is simultaneously rotated to effect the closure of the circuit across contacts 67 and 68 and, since energization of relay 77 results in the engagement of switch member 81 with its associated contacts, the relay 84 is energized through a previously described circuit whenever switch 55 is in engagement with its lowermost contact, in which position it is illustrated in the drawing. Remembering that the bimetallic element 51 of the room thermostat is adapted to engage contact 50 when the space temperature decreases below a predetermined value then, when the temperature within the space reaches the desired minimum value element 51 engages contact 50 to effect energization of relay 52 through the following circuit: From the secondary winding of the transformer 46 through conductor 47, contact 50, bimetallic element 51 in engagement therewith, conductor 53 to relay 52 and thence through conductor 48 to the other side of the secondary winding. Energization of the relay effects upward movement of the pair of switches 54 and 55, the former closing a holding circuit for the relay 52 through conductor 56 and the latter de-energizing relay 84 to terminate operation of the cooling apparatus. The temperature within space 10 then increases gradually at a rate dependent upon outdoor weather conditions until it reaches a predetermined maximum value when the bimetallic element 51 engages contact 49, thereby short circuiting relay 52 causing the de-energization thereof. The switches 54 and 55 thereupon move into the position indicated to again energize relay 84 and initiate operation of the cooling apparatus.

It will be obvious to those skilled in the art that placing the switch 81 in the compressor control relay circuit results in a safety arrangement whereby the fan motor must be energized before the cooling apparatus may be started. If for some reason or another the fan motor is not energized, then the cooling control circuit is broken at 81 and it will be impossible to start it. In this manner, useless operation of the cooling apparatus when the air circulating means is not in operation is prevented and the frosting of the evaporator 20 that would occur when refrigerant is supplied thereto in the absence of air flow is also prevented.

When heating is desired, the manual selector switch is rotated to the heat-humidify position and at this time the air circulating means is placed under the joint control of the room thermostat and the heat exchanger thermostat because of the fact that switch 63 remains in a position where no circuit is closed across contacts 65 and 66. The arrangement is such that the room thermostat initiates operation of the heating means and thereafter when the temperature in the vicinity of the heating means reaches a predetermined value, the fan motor is energized to begin the circulation of air from the space being conditioned.

Assuming that the temperature within the space falls to a predetermined minimum value, then bimetallic element 51 engages contact 50 to energize relay 52 in the previously described manner. Switch 54 is actuated thereby and closes a holding circuit for the relay and switch 55 moves into engagement with contact 59, thereby closing an energizing circuit for the heat control relay 90. This circuit is as follows: From supply conductor 45, conductor 60, switch 55 in engagement with contact 59, conductor 61, contact 69, switch 64, contact 70, conductors 88 and 89 to the relay winding 90 and thence through conductor 91 and one of the pair of conductors 92 to supply conductor 44. Energization of the relay effects upward movement of switches 93 and 94, the former initiating operation of the heat increasing means of furnace 37 and the latter conditioning an energizing circuit for the humidifier control.

The fan, however, does not operate immediately upon initiation of operation of the heating means due to the fact that the energizing circuit therefor is broken and operates only after the heat increasing means has been in operation for a length of time to raise the temperature adjacent the heating element 35 in the conditioner to a value sufficient to effect movement of bimetallic element 75 from engagement with contact 73 into engagement with contact 74. Thereupon the fan control relay 77 is energized through the following circuit: From supply conductor 45 through conductor 60, contacts 55 and 59, conductor 61, contact 69, switch member 64, contact 70, conductor 88, contact 74, bimetallic element 75 in engagement with said contact, conductor 76 to the fan control relay 77 and from thence to the other supply conductor 44 through one of the pair of conductors 78. The fan motor 19 thus is energized to initiate circulation of air through space 10. The circulation of air and supply of heating medium continue as long as the temperature within space 10 does not rise to a predetermined maximum value and the temperature adjacent the heating means is above a predetermined value. However, upon a rise of temperature in space 10 to the predetermined maximum value, the relay 52 is again short circuited by the movement of bimetallic element 51 into engagement with contact 49. The resulting de-energization of relay 52 effects movement of switch 55 from engagement with contact 59 into engagement with contact 58. The disengagement thereof with contact 59 results in a de-energization of the heat control relay 90 and fan control relay 77 and thus the operation of the heat increasing means and air circulating means are simultaneously terminated. Thereafter, upon another decrease in temperature, the operation of the heat increasing means and fan are again initiated in the manner described above.

The humidifying means is conditioned for operation each time the heating means is placed into operation, but the control is so arranged that the fan motor must be energized before it is placed under the control of the humidostat 43 in the space 10. Water is thus admitted to the humidifier only during heating periods when the fan is operating and then only when humidification is required. When the heating means is rendered effective in response to a call for heat from the room thermostat and the fan rendered effective to circulate the air by operation of the heat exchanger thermostat the water supply controlling solenoid 34 is placed under the control of the humidostat by closure of switch 94. When humidification is required, solenoid 34 is energized by the humidostat through the following circuit: from supply conductor 44 through one of conductors 78, conductor 98, the humidostat 43, conductor 97, solenoid 34, conductor 96, switch 94, and conductor 95, conductor 76, thermostatic switch 75 in its right-hand or hot position, contact 74, conductor 88, contacts 70 and 69 of the selective switch 40, conductor 61, contact 59, switch 55 in its upper or heating position, and conductor 60 to the other supply conductor 45. Likewise, when the humidity has been raised sufficiently high, the solenoid is de-energized in an obvious manner. An advantage of the above described control is that there results a minimum of wasted water as water is supplied to the humidifier only when humidification is actually required and when air is circulated through the humidifying means.

It is obvious from the above description of the operation of the control arrangement of my invention that I have provided a very simple arrangement in which a minimum of control apparatus is used to obtain a desirable although complex control and in which I have co-ordinated the heating and cooling control through the use of a single thermostatic element mounted adjacent to or in the near vicinity of the heating means. Although I have shown my invention coupled with control utilizing a single room thermostat, it should be obvious to those skilled in the art that I might equally well use individual thermostats for the heating and cooling means, for instance, by associating them with contacts 58 and 59, respectively. Thus one would control the heating apparatus and the other would control the cooling apparatus, depending upon which had been selected for operation.

While I have shown my invention in conjunction with a manual selector switch, it is obvious that in its broader aspects my invention may be equally well used in systems in which the selection of the particular function to be performed by the air conditioning apparatus may be under thermal control. For example, it would be quite simple to substitute a group of thermally controlled contacts for selecting the various functions to be performed by the air conditioner.

What I claim as new and desire to secure by Letters Patent of the United States is:

1. In air conditioning apparatus the combination including heating means, cooling means, means for selecting either means for operation, thermal responsive means for controlling the operation of the means selected, means for circulating the conditioned air, and means for operating said circulating means continuously when cooling is selected and intermittently when heating is selected, said means including second thermal responsive means located adjacent said heating means and operable between two positions in response to temperature variations, said second thermal responsive means being adapted when in one of said positions to co-operate with said selecting means independently of said first thermal responsive means to continuously energize said air circulating means and adapted to move from one to the other of said positions to co-operate with said first mentioned thermal responsive means and said selecting means to energize said air circulating means under the joint control of said responsive means.

2. In combination, heating means, cooling means, electrically operated air circulating means, electrical means for controlling said heating apparatus, electrical means for controlling said cooling apparatus, selective switching means for selecting either said heating or cooling means for operation, a source of electrical energy, thermal responsive switching means operable between two positions and interconnected with said selective switching means to connect the selected one of said electrical means to said source of energy for controlling the operation of the selected means, and means including a second thermal responsive means located adjacent said heating means and interconnected with said selective switching means in a "cold" position for energizing said air circulating means continuously when said cooling means is selected for operation and interconnected with said selective switching means in a "hot" position for energizing said air circulating means intermittently under the control of both said thermal responsive means when said heating means is selected for operation.

3. In combination, heating means, cooling means, electrically operated air circulating means, electrical means for controlling said heating apparatus, electrical means for controlling said cooling apparatus, means for selecting either said heating or cooling means for operation, a source of electrical energy, thermal responsive means for connecting either of said means to said source of energy to render the selected means effective, and means for operating said air circulating means continuously when cooling is selected and intermittently when heating is selected, said means including a second thermal responsive means adjacent said heating means and adapted when in one position to close a circuit to said air circulating means directly through said selecting means whereby said air circulating means is energized continuously when cooling is selected and when in a second position to which it is adapted to move in response to a predetermined temperature rise to close a circuit to said air circulating means through said selecting means and means controlled by said first thermal responsive means.

4. In combination, heating means, cooling means, electrically operated air circulating means, electrical means for controlling said heating apparatus, electrical means for controlling said cooling apparatus, means for selecting either said heating or cooling means for operation, a source of electrical energy, thermal responsive means for connecting either of said means to said source of energy to render the selected means effective, and means for operating said air circulating means continuously when cooling is selected and intermittently when heating is selected, said means including a second thermal responsive means adjacent said heating means and adapted when in one position to close a circuit to said air circulating means directly through said selecting means whereby said air circulating means is energized continuously when cooling is selected and when in a second position to which it is adapted to move in response to a predetermined temperature rise to close a circuit to said air circulating means through said selecting means and means controlled by said first thermal responsive means, and means for preventing operation of said cooling means unless said air circulating means is in operation.

5. In an air conditioning system, the combination including heating means, cooling means and air circulating means, means for controlling operation of said air circulating means and for selecting either said heating or cooling means for joint operation with said air circulating means, thermal responsive means connected under the control of said selective means for controlling the operation of the selected means, and means including a thermal responsive means located adjacent said heating means and connected under the control of said selective means for rendering said air circulating means operative continuously independently of said first thermal responsive means when said cooling means is selected for operation and under the joint control of said thermal responsive means when said heating means is selected for operation.

6. In an air conditioning system, the combination including heating means, cooling means, humidifying means and air circulating means, means for selecting said cooling means or said heating and humidifying means for operation, thermal responsive means for controlling operation of the selected means, humidity responsive means for jointly controlling operation of said humidifying means, and means including a second thermal responsive means located adjacent said heating means and interconnected with said selecting means for rendering said air circulating means operative continuously independently of said first thermal responsive means when said cooling means is selected for operation and for rendering said air circulating means operative under the joint control of said thermal responsive means when said heating means is selected for operation and said humidifying means operative under the joint control of said thermal responsive means and said humidity responsive means when said heating and humidifying means are selected for operation.

7. In an air conditioning system, the combination including an air conditioner comprising heating, humidifying and air circulating means, control means therefor including thermal responsive means for initiating and terminating operation of said heating means, means for selectively rendering said thermal responsive means inactive and selecting separate operation of said air circulating means, second thermal responsive means located within said conditioner and interconnected with said selecting means for effecting the said separate operation of said air circulating means only when the temperature of the air in said conditioner is below a predetermined value and for initiating operation of said air circulating means when said first thermal responsive means is active and the temperature of the air within said conditioner is above said predetermined value, and humidity responsive means rendered effective for controlling said humidifying means jointly by said first and second thermal responsive means for controlling said humidifying means only when both said heating means and air circulating means are in operation.

8. In an air conditioning system, the combination including heating means, humidifying means, air circulating means, control means therefor including thermal responsive means for controlling said heating means, means for selectively rendering said thermal responsive means inactive and selecting separate operation of said air circulating means, a second thermal responsive means connected with said selecting means for preventing said separate operation when the temperature of the air is above a predetermined value and for effecting operation of said air circulating means jointly with said heating means only when said first thermal responsive means is active and the temperature of the air has been increased above said predetermined value by said heating means, and means including a humidity responsive device for effecting operation of said humidifying means jointly with said air circulating means only when said heating means is in operation.

9. In an air conditioning system adapted to supply conditioned air to a space, the combination including heating means, humidifying means, and air circulating means, thermal responsive means in said space for controlling the operation of said heating means, means for selectively rendering said thermal responsive means inactive and selecting separate operation of said air circulating means, humidity responsive means in said space for controlling the operation of said humidifying means, second thermal responsive means connected with said selecting means for preventing said separate operation of said air circulating means when said first thermal responsive means is inactive and the temperature of the air is above a predetermined value and for effecting operation of said air circulating means jointly with said heating means only when said first thermal responsive means is active and the temperature of the air has been increased above said predetermined value by said heating means, and means for preventing operation of said humidifying means under control of said humidity responsive means until both said heating means and said air circulating means are in operation.

HARRY R. CRAGO.